US012665262B2

(12) United States Patent
Wang et al.

(10) Patent No.: US 12,665,262 B2
(45) Date of Patent: Jun. 23, 2026

(54) BATTERY, DEVICE, AND METHOD AND APPARATUS FOR MANUFACTURING BATTERY

(71) Applicant: CONTEMPORARY AMPEREX TECHNOLOGY (HONG KONG) LIMITED, Hong Kong (CN)

(72) Inventors: Liangyi Wang, Ningde (CN); Feng Qin, Ningde (CN); Lei Wang, Ningde (CN); Jinfeng Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 829 days.

(21) Appl. No.: 17/888,785

(22) Filed: Aug. 16, 2022

(65) Prior Publication Data

US 2022/0407190 A1 Dec. 22, 2022

Related U.S. Application Data

(63) Continuation of application No. PCT/CN2021/076285, filed on Feb. 9, 2021.

(51) Int. Cl.
*H01M 50/516* (2021.01)
*H01M 50/107* (2021.01)
(Continued)

(52) U.S. Cl.
CPC ....... *H01M 50/516* (2021.01); *H01M 50/107* (2021.01); *H01M 50/213* (2021.01);
(Continued)

(58) Field of Classification Search
None
See application file for complete search history.

(56) References Cited

U.S. PATENT DOCUMENTS 6,924,060 B2 8/2005 Hamada et al.
7,393,611 B2 7/2008 Hamada et al.
(Continued)

FOREIGN PATENT DOCUMENTS

CN 1490890 A 4/2004
CN 1937298 A 3/2007
(Continued)

OTHER PUBLICATIONS

Machine English translation of CN102983302A originally published to Wang Mar. 20, 2013 (Year: 2013).*
(Continued)

*Primary Examiner* — Mary Grace Harris
(74) *Attorney, Agent, or Firm* — ANOVA LAW GROUP, PLLC

(57) ABSTRACT

A battery includes two battery cells arranged along a first direction and including two electrode terminals opposite to each other along the first direction. A first electrode of the two electrode terminals is disposed at an end of a first battery cell of the two battery cells along the first direction, and a second electrode of the two electrode terminals is disposed at an end of a second battery cell of the two battery cells along the first direction. Surface contact is formed between two end faces of the two electrode terminals, respectively. The two end faces are opposite to each other along the first direction. The two electrode terminals are configured to be fixedly connected to each other along an outer periphery of at least one of the two end faces to implement electrical connection between the two battery cells.

15 Claims, 12 Drawing Sheets

(51) Int. Cl.
| | |
|---|---|
| *H01M 50/213* | (2021.01) |
| *H01M 50/514* | (2021.01) |
| *H01M 50/517* | (2021.01) |
| *H01M 50/548* | (2021.01) |
| *H01M 50/559* | (2021.01) |
| *H01M 50/566* | (2021.01) |

(52) U.S. Cl.
CPC ....... *H01M 50/514* (2021.01); *H01M 50/517* (2021.01); *H01M 50/548* (2021.01); *H01M 50/559* (2021.01); *H01M 50/566* (2021.01); *H01M 2220/20* (2013.01); *Y02E 60/10* (2013.01)

(56) References Cited

U.S. PATENT DOCUMENTS

| | | | |
|---|---|---|---|
| 2003/0027041 A1 | 2/2003 | Hamada et al. | |
| 2004/0131932 A1 | 7/2004 | Hamada et al. | |
| 2008/0160234 A1* | 7/2008 | Yoshida | H01M 50/152 219/121.64 |
| 2011/0086261 A1* | 4/2011 | Chun | H01M 10/0525 429/163 |
| 2014/0356683 A1* | 12/2014 | Kim | H01M 50/227 429/120 |
| 2015/0099162 A1 | 4/2015 | Wu | |
| 2018/0006286 A1 | 1/2018 | Wu | |
| 2020/0227716 A1 | 7/2020 | Wu | |
| 2020/0235371 A1 | 7/2020 | Wu | |
| 2020/0313150 A1* | 10/2020 | Lu | H01M 10/443 |
| 2022/0216576 A1 | 7/2022 | Wu | |

FOREIGN PATENT DOCUMENTS

| | | | | |
|---|---|---|---|---|
| CN | 101322264 A | 12/2008 | | |
| CN | 100570927 C | 12/2009 | | |
| CN | 102983302 A | 3/2013 | | |
| CN | 101803067 B | 6/2013 | | |
| CN | 111477801 A | 7/2020 | | |
| EP | 1391950 A1 * | 2/2004 | ............ | C01G 53/50 |
| JP | S54115521 U | 8/1979 | | |
| JP | S57161863 U | 10/1982 | | |
| JP | 2003051335 A | 2/2003 | | |
| JP | 2004200118 A | 7/2004 | | |
| JP | 2010080411 A | 4/2010 | | |
| JP | 2012252924 A | 12/2012 | | |
| JP | 2016516289 A | 6/2016 | | |
| WO | 2010146700 A1 | 12/2010 | | |
| WO | 2019116914 A1 | 6/2019 | | |

OTHER PUBLICATIONS

Swanton Welding Company, Differences in Stitch Welding Versus Seam Welding, Jan. 4, 2018 (Year: 2018).*
Kot, Achieving significant savings by reducing weld size through increased penetration, Aug. 16, 2019 (Year: 2019).*
Zhang et al, Re-Evaluation of Fatigue Curves for Flush Ground Girth Welds, Oct. 2008, TWI Ltd. (Year: 2008).*
The World Intellectual Property Organization (WIPO) International Search Report and Written Opinion for PCT/CN2021/076285 Oct. 27, 2021 18 pages (with translation).
The Korean Intellectual Property Office Notice of Preliminary Rejection for Application No. 10-2022-7039519 Feb. 27, 2025 20 Pages (including translation).
The European Patent Office (EPO) Extended Search Report for EP Application No. 21923599.1 May 8, 2023 7 Pages.
The Japan Patent Office (JPO) Notification of Reasons for Refusal for Application No. 2022-568628 Dec. 25, 2023 7 Pages (including translation).

* cited by examiner

1

10

BATTERY, DEVICE, AND METHOD AND APPARATUS FOR MANUFACTURING BATTERY

CROSS-REFERENCE TO RELATED APPLICATION

This application is a continuation of International Application No. PCT/CN2021/076285, filed Feb. 9, 2021, the entire content of which is incorporated herein by reference.

TECHNICAL FIELD

Embodiments of this application relate to the field of batteries, and in particular, to a battery, a device, and a method and apparatus for manufacturing a battery.

BACKGROUND

With ongoing development of battery technology, higher requirements are imposed on the performance of batteries, and a battery is expected to allow for a variety of design factors concurrently. Generally, a plurality of battery cells are connected in series and parallel by a busbar component. However, such a structure is adverse to saving space.

SUMMARY

Embodiments of this application provide a battery, a device, a method and apparatus for manufacturing a battery, and can save battery arrangement space and increase an energy density per unit volume of the battery.

According to a first aspect, a battery is provided, including: a plurality of battery cells arranged along a first direction, where an electrode terminal is disposed at each of two ends of each of the battery cells along the first direction, so that two battery cells include two electrode terminals opposite to each other along the first direction. Surface contact is formed between two end faces opposite to each other along the first direction and belonging to the two electrode terminals. The two electrode terminals are configured to be fixedly connected along an outer periphery of at least one of the two end faces to implement electrical connection between two battery cells.

In the technical solution of embodiments of this application, fixed connection is implemented along the outer periphery of at least one of the two surface-contacting end faces, so as to: (i) implement a firm connection between the two battery cells; (ii) increase a heat conduction area between the battery cells, and avoid impact caused by thermal shock to the battery cells; and (iii) decrease connecting components between the battery cells, so as to arrange the battery cells more closely and increase the energy density per unit volume of the battery.

In some embodiments, a shape of each of the end faces of the electrode terminal is a closed shape. A surface enclosed by the closed shape is configured to form the surface contact. In some embodiments, a shape of each of the end faces of the electrode terminal is a circle, an ellipse, or a polygon.

With the end face being a closed shape, the contact area of the surface contact is increased, thereby increasing the connection strength. In addition, heat is generated in a case of fixedly connecting (such as welding) a plurality of battery cells. With the surface contact formed by using the surface enclosed by the closed pattern, the heat conduction area between the battery cells is further increased, and the impact caused to the battery cells by the thermal shock generated by the fixed connection is reduced. In addition, heat is also generated during the charging and discharging of the battery. By further increasing the heat conduction area between the battery cells, the temperature is equalized between battery cells, and a fixed connection part between the battery cells is prevented from being weakened by excessive local heat.

In some embodiments, the two end faces are equal in area and identical in shape, and projections of the two end faces along the first direction are coincident.

Therefore, on the one hand, the two end faces of the battery cell are identical in shape, and can be formed by using the same component. On the other hand, the projections of the two end faces along the first direction are caused to be coincident, thereby facilitating fixed connection along the outer periphery of the end face.

In some embodiments, the two end faces are different in area. Along the first direction, a projection of an end face with a smaller area falls within a projection of an end face with a larger area among the two end faces. This ensures sufficient connection strength and heat conduction area between two battery cells.

In some embodiments, the two electrode terminals disposed opposite to each other along the first direction are configured to be fixedly connected continuously along the outer periphery of at least one of the two end faces. More specifically, the "two electrode terminals" here are "two electrode terminals disposed opposite to each other along the first direction and belonging to the two battery cells". This further ensures sufficient connection strength and heat conduction area between two battery cells.

In some embodiments, the two electrode terminals disposed opposite to each other along the first direction are configured to be fixedly connected discontinuously along the outer periphery of at least one of the two end faces. More specifically, the "two electrode terminals" here are "two electrode terminals disposed opposite to each other along the first direction and belonging to the two battery cells". In this way, the two electrode terminals can be connected fixedly at a high degree of freedom.

In some embodiments, the electrode terminal protrudes along the first direction away from an interior of the battery cell, and a protrusion height is at least 2 mm. Therefore, on the one hand, the operation space is increased during the fixed connection. On the other hand, a conduction distance of the heat generated in a case of fixedly connecting the two electrode terminals to a housing of the battery is increased, so as to avoid impact caused by thermal shock to the battery cell.

In some embodiments, an end cap is disposed at each of two ends of the battery cell along the first direction. The electrode terminal is disposed at the end cap. A spacing between two end caps disposed opposite to each other along the first direction and belonging to the two battery cells is 4 mm to 20 mm. Therefore, on the one hand, the operation space is increased in a case of fixedly connecting two battery cells. On the other hand, space is saved, and the energy density per unit volume of the battery is increased.

In some embodiments, one of the two electrode terminals includes a bulge protruding from the end face, and the other of the two electrode terminals includes a recess that sinks from the end face. The recess and the bulge snap-fit with each other in the first direction. Therefore, through the fit between the bulge and the recess, the two battery cells are aligned with each other more accurately, and the arrangement error of the battery cells is reduced.

In some embodiments, the electrode terminal includes a side face connected to the end face. A distance between the side face of the electrode terminal and an inner sidewall of the recess in a second direction is at least 2 mm. The second direction is perpendicular to the first direction. This further ensures sufficient connection strength between two battery cells. In addition, high connection strength is ensured when the electrode terminal is fixedly connected to the busbar component.

In some embodiments, a weld portion is formed at the outer periphery of at least one of the two end faces. The weld portion is configured to implement fixed connection between the two electrode terminals disposed opposite to each other along the first direction. More specifically, the "two electrode terminals" here are "two electrode terminals disposed opposite to each other along the first direction and belonging to the two battery cells". This facilitates the fixed connection between the two electrode terminal and ensures sufficient connection strength.

In some embodiments, the electrode terminal includes a side face and a connecting face. The connecting face is configured to connect the end face and the side face. Two connecting faces of the two electrode terminals disposed opposite to each other along the first direction are configured to form an accommodation space. The weld portion is formed in the accommodation space. The weld portion does not extend beyond the side face in a second direction. The second direction is perpendicular to the first direction. More specifically, the "two electrode terminals" here are "two electrode terminals disposed opposite to each other along the first direction and belonging to the two battery cells".

In some embodiments, the connecting face is an inclined face, a stepped face, or a curved face.

In this way, the weld portion is formed in the accommodation space without protruding from the side face of the electrode terminal. On the one hand, deviations of the weld portions between the battery cells are reduced, and steady fixed connection is implemented. On the other hand, the levelness of the side face of the electrode terminal is maintained, and it is convenient to arrange various signal sampling parts on the side face of the electrode terminal.

In some embodiments, a stress release portion is formed at an outer periphery of at least one of the two electrode terminals disposed opposite to each other along the first direction. The stress release portion is configured to release a stress generated in a case of fixedly connecting the two electrode terminals disposed opposite to each other along the first direction. More specifically, the "two electrode terminals" here are "two electrode terminals disposed opposite to each other along the first direction and belonging to the two battery cells".

In a case of fixedly connecting (such as welding) along the outer periphery of at least one of the two surface-contacted end faces, a part that is fixedly connected first shrinks to some extent against a part that is fixedly connected later, thereby resulting in a stress. Through the foregoing structure, the stress generated in a case of fixedly connecting the two battery cells can be released by the stress release portion, thereby preventing the electrode terminal from being deformed by the stress in a process of fixedly connecting the outer periphery of the electrode terminal.

In some embodiments, the stress release portion is a groove disposed at the outer periphery of at least one of the two electrode terminals disposed opposite to each other along the first direction. More specifically, the "two electrode terminals" here are "two electrode terminals disposed opposite to each other along the first direction and belonging to the two battery cells". This facilitates processing of the stress release portion.

In some embodiments, the groove is an annular groove formed along the outer periphery of the electrode terminal. Therefore, on the one hand, the stress release portion is easily processible. On the other hand, during the fixed connection, it is not necessary to select an initial operation position for starting the fixed connection, thereby increasing the convenience of operation.

In some embodiments, a weld portion is formed at the outer periphery of at least one of the two end faces. In a second direction, a depth of the groove is less than a depth of the weld portion. The second direction is perpendicular to the first direction. In this way, the weld portion is rigid enough to avoid looseness of the connection part of the electrode terminal caused by deformation.

In some embodiments, a cross-sectional shape of the groove is a rectangle, a trapezoid, a semicircle, or an arch. This facilitates processing of the stress release portion.

According to a second aspect, a device is provided, including the battery according to the first aspect. The battery is configured to provide electrical energy.

According to a third aspect, a method for manufacturing a battery is provided. The method includes: providing a plurality of battery cells arranged along a first direction, where an electrode terminal is disposed at each of two ends of each of the battery cells along the first direction, so that two battery cells include two electrode terminals opposite to each other along the first direction; and forming surface contact between two end faces opposite to each other along the first direction and belonging to the two electrode terminals, and connecting the two electrode terminals fixedly along an outer periphery of at least one of the two end faces to implement electrical connection between the two battery cells.

According to a fourth aspect, an apparatus for manufacturing a battery is provided. The apparatus includes: a providing module, configured to provide a plurality of battery cells arranged along a first direction, where an electrode terminal is disposed at each of two ends of each of the battery cells along the first direction, so that two battery cells include two electrode terminals opposite to each other along the first direction; and an assembling module, configured to form surface contact between two end faces opposite to each other along the first direction and belonging to the two electrode terminals, and connect the two electrode terminals fixedly along an outer periphery of at least one of the two end faces to implement electrical connection between the two battery cells.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

DETAILED DESCRIPTION OF EMBODIMENTS

Figure 1:
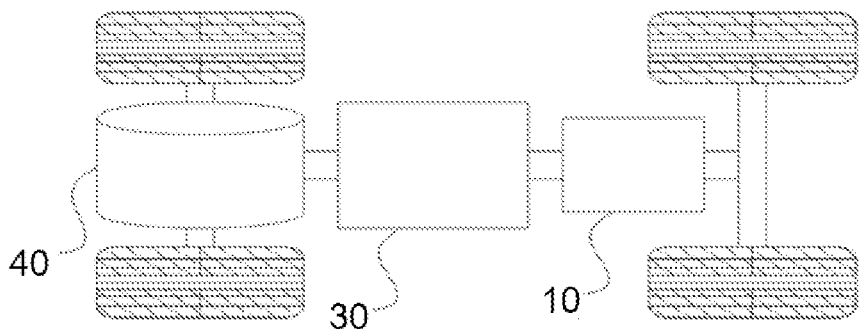
FIG. 1 is a schematic structural diagram of a vehicle powered by a battery disclosed herein according to some embodiments of this application.

To make the objectives, technical solutions, and advantages of this application clearer, the following gives an explicit and thorough description of the technical solutions in the embodiments of this application with reference to the drawings in the embodiments of this application. Understandably, the described embodiments are merely a part of but not all of the embodiments of this application. All other embodiments derived by a person of ordinary skill in the art based on the embodiments described herein without making any creative effort fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include", "comprise", "possess", "contain", and any variations thereof used in the specification, claims, and brief description of drawings hereof are used in a nonrestrictive way. Therefore, a method or device that "includes", "comprises", or "contains" one or more steps or elements, includes but is not limited to, the one or more steps or elements enumerated. The terms such as "first" and "second" used in the specification, claims, and brief description of drawings herein are intended to distinguish between different items, but are not intended to describe a specific sequence or order of precedence. In addition, the terms "first" and "second" are used merely for descriptive purposes but are not to be construed as indicating or implying relative importance or implicitly specifying the quantity of technical features indicated. Therefore, a feature qualified by "first", "second" and the like may explicitly or implicitly include one or more such features. In the description of this application, unless otherwise specified, "a plurality of" means two or more.

Understandably, in the description of this application, a direction or a positional relationship indicated by the terms such as "center", "transverse", "length", "width", "up", "down", "before", "after", "left", "right", "vertical", "horizontal", "top", "bottom", "in", "out", "axial", "radial", and "circumferential" is a direction or positional relationship based on the illustration in the drawings, and is merely intended for ease or brevity of description of this application, but not intended to indicate or imply that the indicated device or element must be located in the specified direction or constructed or operated in the specified direction. Therefore, such terms are not to be understood as a limitation on this application.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

As mentioned above, it needs to be emphasized that the term "include/comprise" used in this specification is intended to explicitly indicate the existence of the mentioned feature, integer, step or component, but does not exclude the existence or addition of one or more other features, integers, steps, or components, or a group of features, integers, steps, or components. Unless otherwise expressly specified in the context, a noun in the singular form preceded by "a", "an", or "the" as used in this application also includes the plural form thereof.

The terms "a" and "an" in this specification may mean one, but may also have the same meaning as "at least one" or "one or more". The term "approximately" qualifying a numerical value generally means the numerical value plus or minus 10% thereof, or more specifically, plus or minus 5% thereof. Unless expressly indicating only an alternative solution, the term "or" used in the claims means "and/or".

The term "and/or" in this application indicates merely a relation for describing the related objects, and represents three possible relationships. For example, "A and/or B" may represent the following three circumstances: A alone, both A and B, and B alone. In addition, the character "/" herein generally indicates an "or" relationship between the object preceding the character and the object following the character.

Batteries mentioned in this field may be classed into a primary battery and a rechargeable battery depending on rechargeability. The primary battery (primary battery) is informally known as a "disposable" battery or a galvanic battery because the battery is not rechargeable and has to be discarded after consumption of electrical power. A rechargeable battery is also called a secondary battery (secondary battery), secondary cell, or storage battery. A material for and a process of manufacturing a rechargeable battery are different from those of a primary battery. An advantage of the rechargeable battery is that the battery can be used for a plurality of cycles after being charged. An output current load capacity of the rechargeable battery is higher than that of most primary batteries. Currently, common types of rechargeable batteries include: lead-acid battery, nickel-metal hydride battery, and lithium-ion battery. The lithium-ion battery exhibits advantages such as a light weight, a high capacity (the capacity is 1.5 to 2 times that of a nickel-metal hydride battery of the same weight), and no memory effect, and exhibits a very low self-discharge rate. Therefore, despite relative expensiveness, the lithium-ion battery is widely applied. The lithium-ion battery is also applied to battery electric vehicles and hybrid vehicles. The lithium-ion battery for use in such vehicles possesses a relatively low capacity, but a relatively high output current, a relatively high charge current, and a relatively long life in spite of a relatively high cost.

The battery described in the embodiments of this application means a rechargeable battery. The following describes the conception of this application using a lithium-ion battery as an example. Understandably, this application is applicable to any other suitable types of rechargeable batteries.

The battery mentioned in the embodiments of this application means a stand-alone physical module that includes one or more battery cells to provide a higher voltage and a higher capacity. For example, the battery mentioned in this application may include a battery module, a battery pack, or the like. A battery cell includes a positive electrode plate, a negative electrode plate, an electrolytic solution, and a separator, and is a basic structural unit of a battery module and a battery pack. Depending on the form of packaging, battery cells are generally classed into three types: cylindrical battery cell, prismatic battery cell, and pouch-type battery cell.

A lithium-ion battery cell works primarily by relying on movement of lithium ions between the positive electrode plate and the negative electrode plate. The lithium-ion battery cell uses an intercalated lithium compound as an electrode material. Currently, positive electrode materials typically used for lithium-ion batteries include: lithium cobalt oxide ($LiCoO_2$), lithium manganese oxide ($LiMn_2O_4$), lithium nickel oxide ($LiNiO_2$), and lithium iron phosphate ($LiFePO_4$). A separator is disposed between the positive electrode plate and the negative electrode plate to form a thin film structure compounded of three layers of materials. The thin film structure is generally wound or stacked to form an electrode assembly of a desired shape. For example, the thin film structure compounded of three layers of materials in a cylindrical battery cell is wound into a cylinder-shaped electrode assembly. The thin film structure in a prismatic battery cell is wound or stacked to form an electrode assembly in the shape of approximately a cuboid.

A plurality of battery cells may be connected together in series and/or parallel through electrode terminals, so as to be applied in various scenarios. In high-power application scenarios such as electric vehicles, a battery is applied in different hierarchical forms such as a battery cell, a battery module, and a battery pack. The battery module is formed by electrically connecting a specific quantity of battery cells together and putting the battery cells into a frame, so as to protect the battery cells from external impact, heat, vibration, and the like. The battery pack is a final state of a battery system mounted in an electric vehicle. Currently, most of battery packs are made by assembling various control and protection systems such as a battery management system (BMS) and a thermal management part on one or more battery modules. With advancement of technologies, the battery module is omissible. That is, a battery pack is directly formed from battery cells. This improvement significantly decreases the quantity of parts while enhancing a gravimetric energy density and a volumetric energy density of the battery system. Reference to a battery in this application includes a battery module or a battery pack.

In the existing technologies, a plurality of battery cells are generally connected in series and parallel by a busbar component. However, such a structure is adverse to saving space.

In view of this, this application provides a battery, including: a plurality of battery cells arranged along a first direction, where an electrode terminal is disposed at each of two ends of each of the battery cells along the first direction, so that two battery cells include two electrode terminals opposite to each other along the first direction. Surface contact is formed between two end faces opposite to each other along the first direction and belonging to the two electrode terminals. The two electrode terminals are configured to be fixedly connected along an outer periphery of at least one of the two end faces to implement electrical connection between the two battery cells. Fixed connection is implemented along the outer periphery of at least one of the two surface-contacting end faces, so as to: (i) implement a firm connection between the two battery cells; (ii) increase a heat conduction area between the battery cells, and avoid impact caused by thermal shock to the battery cells; and (iii) decrease connecting components between the battery cells, so as to arrange the battery cells more closely and increase the energy density per unit volume of the battery.

All technical solutions described in the embodiments of this application are applicable to various battery-powered devices such as a mobile phone, a portable device, a laptop computer, an electric power cart, an electrical toy, a power tool, an electric vehicle, a ship, and a spacecraft. The spacecraft includes, for example, an airplane, a rocket, a space shuttle, and a spaceship.

Understandably, the technical solutions described in the embodiments of this application are not only applicable to the devices described above, but also applicable to all battery-powered devices. However, for brevity, the following embodiments are described by using an electric vehicle as an example.

For example, as shown in FIG. 1, which is a schematic structural diagram of a vehicle 1 according to an embodiment of this application, the vehicle 1 may be an oil-fueled vehicle, a natural gas vehicle, or a new energy vehicle. The new energy vehicle may be a battery electric vehicle, a hybrid electric vehicle, a range-extended electric vehicle, or the like. A motor 40, a controller 30, and a battery 10 may be disposed inside the vehicle 1. The controller 30 is configured to control the battery 10 to supply power to the motor 40. For example, the battery 10 may be disposed at the bottom, front, or rear of the vehicle 1. The battery 10 may be configured to supply power to the vehicle 1. For example, the battery 10 may serve as an operating power supply of the vehicle 1 to power a circuit system of the vehicle 1. For example, the battery may be configured to meet operating power usage requirements of the vehicle 1 that is being started, navigated, or running. In another embodiment of this application, the battery 10 serves not only as an operating power supply of the vehicle 1, but may also serve as a drive power supply of the vehicle 1 to provide driving motive power for the vehicle 1 in place of or partially in place of oil or natural gas.

Depending on different power requirements, the number of battery cells 20 may be set to any value. A plurality of battery cells 20 may be connected in series, in parallel, or in both series and parallel to achieve a relatively high capacity or power. Each battery 10 may include a relatively large number of battery cells 20. Therefore, in order to facilitate mounting, the battery cells 20 may be arranged in groups. Each group of battery cells 20 forms a battery module. The number of battery cells 20 included in the battery module is not limited, and may be set as required.

Figure 2:
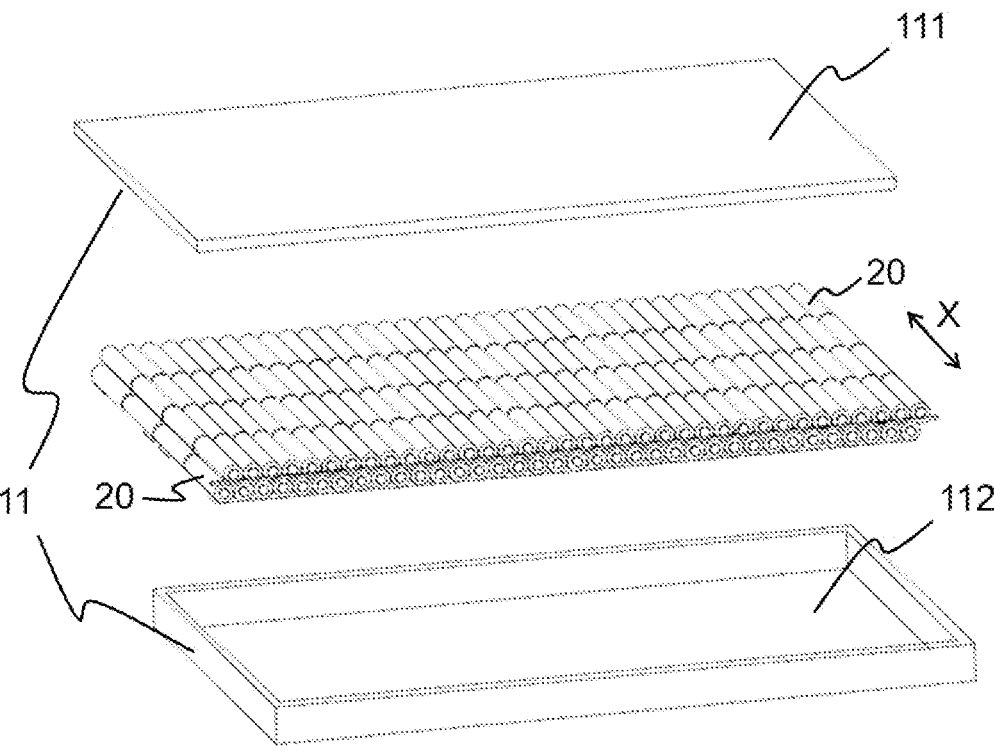
FIG. 2 is a schematic exploded view of a battery according to some embodiments of this application.

FIG. 2 is an exploded view of a battery 10 according to some embodiments of this application. The battery 10 may include a plurality of battery cells 20. The battery 10 may further include a box 11. The interior of the box 11 is a hollow structure. A plurality of battery cells 20 are accommodated in the box 11. As shown in FIG. 2, the box 11 may include two parts, herein referred to as an upper cover 111 and a shell 112 respectively. The upper cover 111 and the shell 112 are snap-fitted together. The shapes of the upper cover 111 and the shell 112 may be determined depending on the shape of a combination of the plurality of battery cells 20. The upper cover 111 and the shell 112 each may be provided with an opening. For example, both the upper cover 111 and the shell 112 are a hollow cuboid, and each include only one opened surface. The opening of the upper cover 111 is disposed opposite to the opening of the shell 112. The upper cover 111 is snap-fitted to the shell 112 to form a box with a closed chamber. In addition, optionally, one of the upper cover 111 or the shell 112 may be a cuboid provided with an opening, and the other may be in the shape of a flat plate. The plurality of battery cells 20 are combined and connected in parallel, series, or series-and-parallel pattern, and then placed into the box 11 that is formed by snap-fitting the upper box 111 and the shell 112.

Optionally, the battery 10 may further include other structures, details of which are omitted here. For example, a multilayer combination of battery cells 20 is disposed, or a plurality of battery cells 20 are combined into one battery module, and a plurality of battery modules are disposed in the battery 10, or a busbar component, a signal acquisition wire harness, a processor, and the like are disposed.

As shown in FIG. 2, the plurality of battery cells 20 may be arranged in a first direction X and a direction perpendicular to the first direction X. In the first direction X, the plurality of battery cells 20 are arranged in an end-to-end way. That is, a length direction of each of the plurality of battery cells 20 is parallel to the first direction X. Specifically, the two battery cells 20 adjacent in the first direction X may be electrically connected by fixedly connecting the electrode terminals 214 (refer to FIG. 3) thereof. The electrical connection may be in series or parallel. In a case that no protruding electrode terminal 214 is disposed at the end cap 212 (refer to FIG. 3) of the battery cell 20, the electrode terminals 214 of one battery cell 20 may be fixedly connected onto the end cap 212 of the other battery cell 20 instead, or the end caps 212 of the two battery cells 20 may be connected fixedly. In addition, in a direction perpendicular to the first direction X, the plurality of battery cells 20 are arranged alongside. The plurality of battery cells 20 are arranged by aligning the end caps 212 (refer to FIG. 3) in the direction perpendicular to the first direction X.

Figure 3:
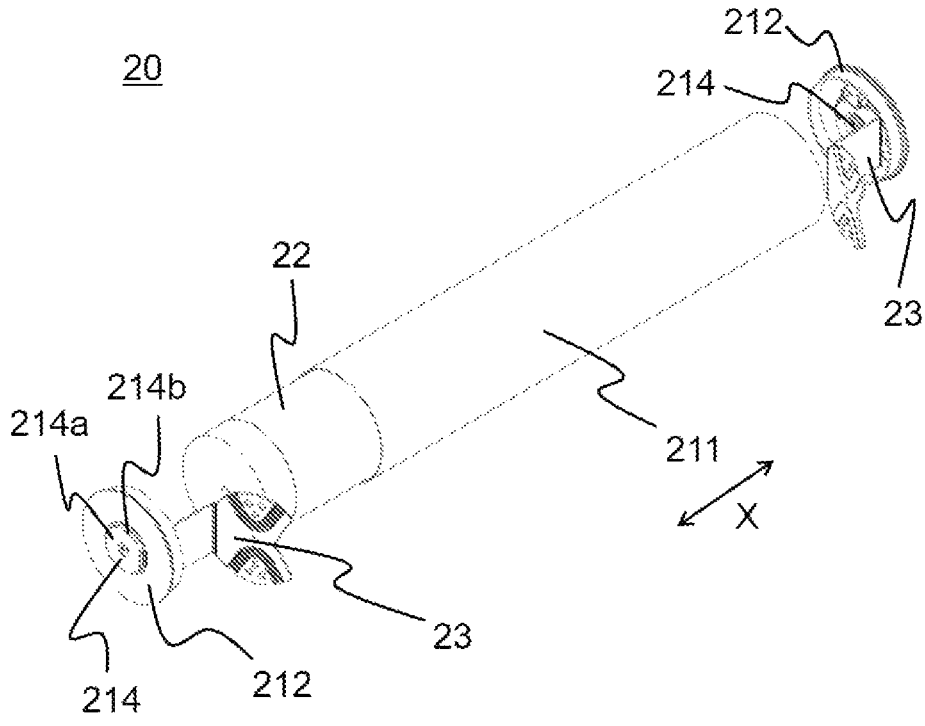
FIG. 3 is a schematic exploded view of a battery cell according to some embodiments of this application.

FIG. 3 is a schematic exploded view of a battery cell 20 according to some embodiments of this application. As shown in FIG. 3, the battery cell 20 may include a housing 211, an end cap 212, and one or more electrode assemblies 22 disposed in the housing 211. The shape of the housing 211 is determined depending on the shape of a combination of one or more electrode assemblies 22. For example, the housing 211 may be a hollow cuboid or cube or cylinder. The housing 211 is provided with an opening through which one or more electrode assemblies 22 can be placed into the housing 211 conveniently. For example, when the housing 211 is a hollow cuboid or cube, one of faces of the housing 211 is opened. The opened face enables communication between inside and outside of the housing 211. When the housing 211 is a hollow cylinder. An end face of the housing 211 is opened to implement communication between inside and outside of the housing 211. The end cap 212 covers the opening and is connected to the housing 211 to form a closed cavity that is configured to accommodate the electrode assembly 22. The housing 211 is filled with an electrolyte such as an electrolytic solution.

As shown in FIG. 3, the battery cell 20 may further include two electrode terminals 214. The two electrode terminals 214 may be disposed at the end cap 212, and may protrude from the end cap 212 toward a direction away from the interior of the battery cell 20. The end cap 212 is generally in the shape of a flat plate. The two electrode terminals 214 are fixed on a flat surface of the end cap 212. The electrode terminal 214 may include an end face 214a and a side face 214b. A connecting member 23, also referred to as a current collecting member, is disposed corresponding to each electrode terminal 214, located between the end cap 212 and the electrode assembly 22, and configured to electrically connect the electrode assembly 22 and the electrode terminal 214. In addition, the electrode terminal 214 may be in various shapes such as a cylinder, a cuboid, a cube, or a polygonal column. The electrode terminal 214 described in this embodiment is a cylindrical structure. Moreover, the battery cell 20 may be a cuboid, a cube, or a cylinder. The battery cell 20 described in this embodiment is a cylinder, with an axis coincident with the axis of the cylindrical electrode terminal 214.

The two electrode terminals 214 are a positive electrode terminal and a negative electrode terminal respectively. Optionally, neither of the two electrode terminals 214 protrudes from the end cap 212; or, one electrode terminal 214 protrudes from the end cap 212, and the other electrode terminal 214 does not protrude from the end cap 212. When the electrode terminal 214 does not protrude from the end cap 212, the end cap 212 may directly serve as the electrode terminal 214 to lead out the electrical energy of the battery cell 20. In addition, optionally, the battery cell 20 may include only one end cap 212. The two electrode terminals 214 may be disposed at the same end cap 212.

Figure 4:
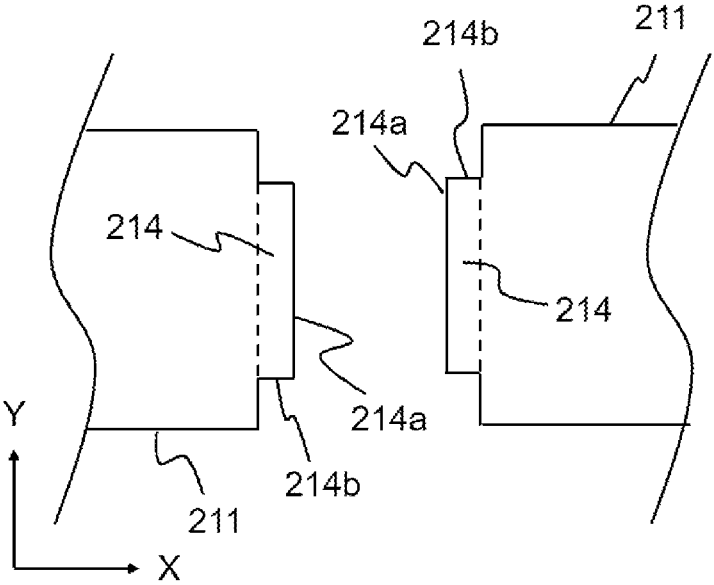
FIG. 4 is a schematic sectional view of two battery cells before being connected fixedly according to some embodiments of this application.
Figure 5:
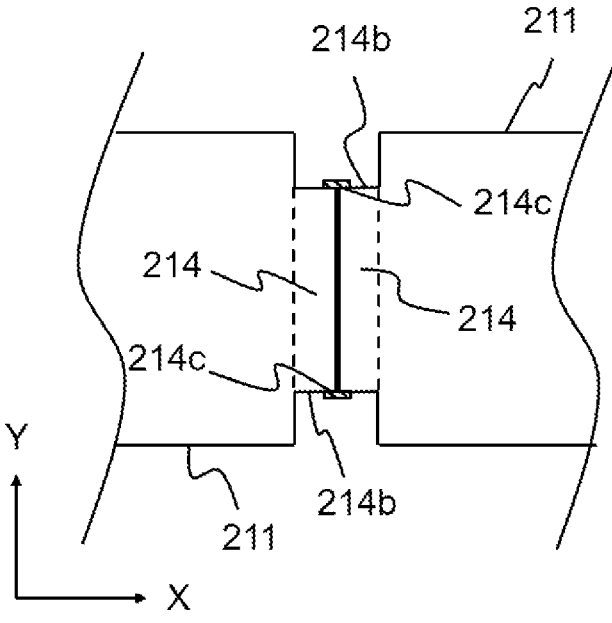
FIG. 5 is a schematic sectional view of the two battery cells shown in FIG. 4 and connected fixedly.

FIG. 4 is a schematic sectional view of two battery cells 20 before being connected fixedly according to some embodiments of this application, and FIG. 5 is a schematic sectional view of the two battery cells 20 shown in FIG. 4 and connected fixedly. As shown in FIG. 2 to FIG. 5, a battery 10 according to an embodiment of this application includes a plurality of battery cells 20 arranged along a first direction X. An electrode terminal 214 is disposed at each of two ends of each of the battery cells 20 along the first direction X, so that two battery cells 20 include two electrode terminals 214 opposite to each other along the first direction X. Surface contact is formed between two end faces 214a opposite to each other along the first direction X and belonging to the two electrode terminals 214. The two electrode terminals 214 are configured to be fixedly connected along an outer periphery of at least one of the two end faces 214a to implement electrical connection between the two battery cells 20.

Therefore, fixed connection is implemented along the outer periphery of at least one of the two surface-contacting end faces 214a, so as to: (i) implement a firm connection between the two battery cells 20; (ii) increase a heat conduction area between the battery cells 20, and avoid impact caused by thermal shock to the battery cells 20; and (iii) decrease connecting components between the battery cells 20, so as to arrange the battery cells 20 more closely and increase the energy density per unit volume of the battery. Here, the fixed connection is implemented by welding, or by coating with a conductive binder, for example. Here, the welding may be any one of fusion welding, pressure welding, or brazing.

Optionally, in some embodiments of this application, the shape of the end face 214a of the electrode terminal 214 is a closed shape. A surface enclosed by the closed shape is configured to form the surface contact.

Optionally, in some embodiments of this application, the shape of the end face 214a of the electrode terminal 214 is a circle, an ellipse, or a polygon. Here, polygons may include a triangle, a quadrilateral, a pentagon, and the like.

With the end face 214a being a closed shape, the contact area of the surface contact is increased, thereby increasing the connection strength. In addition, heat is generated in a case of fixedly connecting (such as welding) a plurality of battery cells 20. With the surface contact formed by using the surface enclosed by the closed pattern, the heat conduction area between the battery cells 20 is further increased, and the impact caused to the battery cells 20 by the thermal shock generated by the fixed connection is reduced. In addition, heat is also generated during the charging and discharging of the battery 10. By further increasing the heat conduction area between the battery cells 20, the temperature is equalized between the battery cells 20, and the fixed connection part between the battery cells 20 is prevented from being weakened by excessive local heat.

As shown in FIG. 4 and FIG. 5, the two end faces 214a are equal in area and identical in shape, and projections of the two end faces 214a along the first direction X are coincident. Therefore, on the one hand, the two end faces 214a of the battery cell 20 are identical in shape, and the two end faces 214a can be formed by using the same component. On the other hand, the projections of the two end faces 214a along the first direction X are caused to be coincident, thereby facilitating fixed connection along the outer peripheries of the two end face 214a. The shaded part in FIG. 5 is a fixed connection portion 214c of the two end faces 214a.

Figure 6:
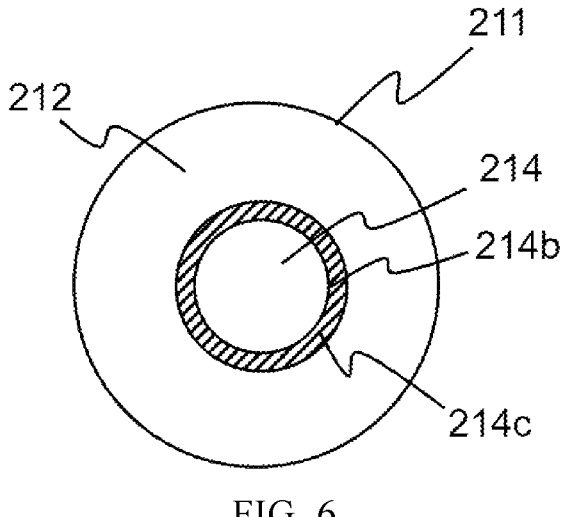
FIG. 6 is a sectional view of an end face of a battery cell according to some embodiments of this application.
Figure 7:
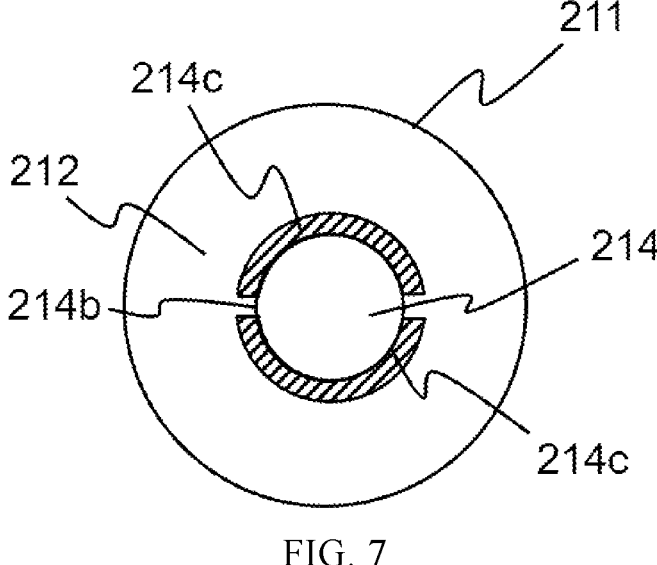
FIG. 7 is a sectional view of an end face of a battery cell according to some embodiments of this application.

FIG. 6 is a sectional view of an end face 214a of a battery cell 20 according to some embodiments of this application. FIG. 7 is a sectional view of an end face 214a of a battery cell 20 according to some embodiments of this application.

As shown in FIG. 6, the two electrode terminals 214 disposed opposite to each other along the first direction X are configured to be fixedly connected continuously along the outer periphery of at least one of the two end faces 214a. More specifically, the "two electrode terminals 214" here are "two electrode terminals 214 disposed opposite to each other along the first direction and belonging to the two battery cells 20". That is, the fixed connection portion 214c represented by the shaded part in FIG. 6 is formed continuously along the outer periphery of the end face 214a. This further ensures sufficient connection strength and heat conduction area between two battery cells 20.

As shown in FIG. 7, the two electrode terminals 214 disposed opposite to each other along the first direction X are configured to be fixedly connected discontinuously along the outer periphery of at least one of the two end faces 214a. That is, the fixed connection portion 214c denoted by the shaded part in FIG. 7 is formed discontinuously along the outer periphery of the end face 214a. More specifically, the "two electrode terminals 214" here are "two electrode terminals 214 disposed opposite to each other along the first direction and belonging to the two battery cells 20". In the embodiment shown in FIG. 7, the fixed connection portion 214c is divided into two sections. However, without being limited to the example, the fixed connection portion may be divided into a plurality of sections instead. In this way, the two electrode terminals 214 can be connected fixedly at a high degree of freedom.

Figure 8:
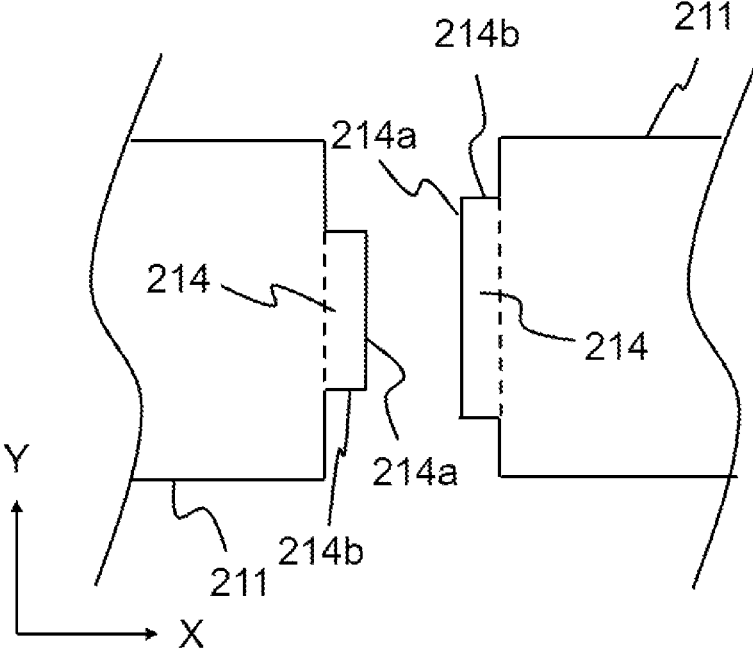
FIG. 8 is a schematic sectional view of two battery cells before being connected fixedly according to some embodiments of this application.
Figure 9:
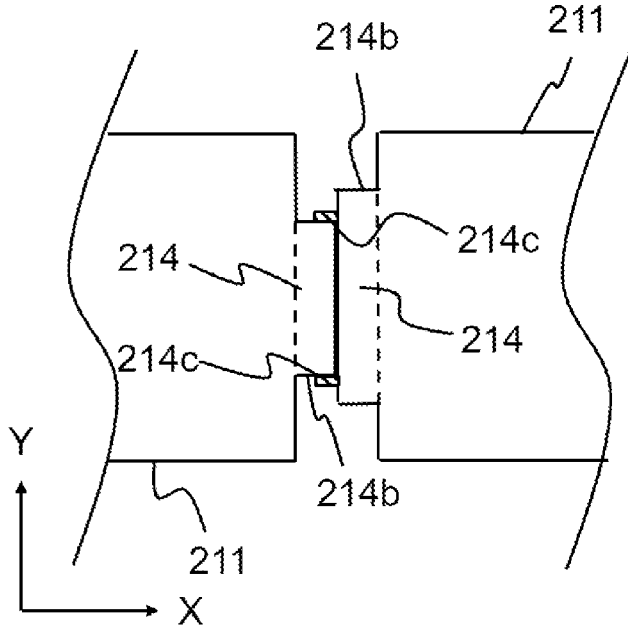
FIG. 9 is a schematic sectional view of the two battery cells shown in FIG. 8 and connected fixedly.

FIG. 8 is a schematic sectional view of two battery cells 20 before being connected fixedly according to some embodiments of this application. FIG. 9 is a schematic sectional view of the two battery cells 20 shown in FIG. 8 and connected fixedly.

As shown in FIG. 8 and FIG. 9, the two end faces 214a of the two battery cells 20 are different in area. Along the first direction X, a projection of an end face with a smaller area falls within a projection of an end face with a larger area among the two end faces 214a. This ensures sufficient connection strength and heat conduction area between two battery cells 20.

Optionally, in some embodiments of this application, the electrode terminal 214 protrudes along the first direction X away from the interior of the battery cell 20, and a protrusion height is at least 2 mm. Preferably, the protrusion height is at least 3 mm, and more preferably, at least 4 mm. Therefore, on the one hand, the operation space is increased during the fixed connection. On the other hand, a conduction distance of the heat generated in a case of fixedly connecting the two electrode terminals 214 to a housing 211 of the battery is increased, so as to avoid impact caused by thermal shock to the battery cell 20.

Optionally, in some embodiments of this application, an end cap 212 is disposed at each of two ends of the battery cell 20 along the first direction X. The electrode terminal 214 is disposed at the end cap 212. A spacing between two end caps 212 disposed opposite to each other along the first direction X and belonging to the two battery cells 20 is 4 mm to 20 mm, preferably, 5 to 18 mm, and more preferably, 6 to 15 mm. That is, the spacing between the end caps 212 of the two battery cells 20 falls within the foregoing range. Therefore, on the one hand, the operation space is increased in a case of fixedly connecting two battery cells 20. On the other hand, space is saved, and the energy density per unit volume of the battery is increased.

Figure 10:
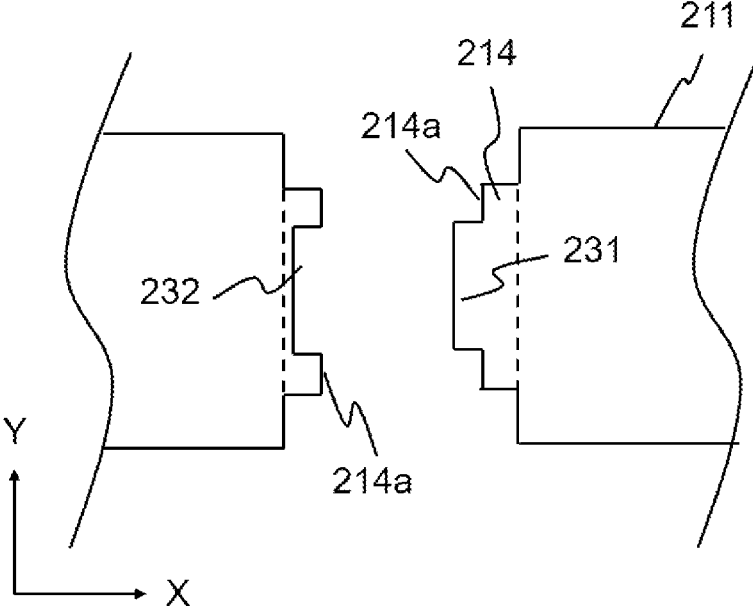
FIG. 10 is a schematic sectional view of two battery cells before being connected fixedly according to some embodiments of this application.
Figure 11:
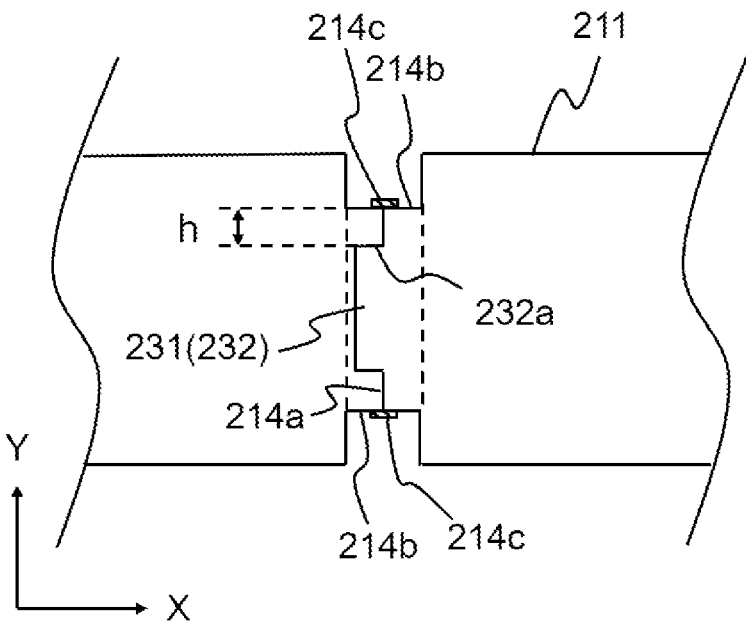
FIG. 11 is a schematic sectional view of the two battery cells shown in FIG. 10 and connected fixedly.

FIG. 10 is a schematic sectional view of two battery cells 20 before being connected fixedly according to some embodiments of this application. FIG. 11 is a schematic sectional view of the two battery cells 20 shown in FIG. 10 and connected fixedly. As shown in FIG. 10 and FIG. 11, one of the two electrode terminals 214 includes a bulge 231 protruding from the end face 214a, and the other of the two electrode terminals 214 includes a recess 232 that sinks from the end face 214a. The recess 232 and the bulge 231 snap-fit with each other in the first direction X. Therefore, through the fit between the bulge 231 and the recess 232, the two battery cells 20 are aligned with each other more accurately, and the arrangement error of the battery cells 20 is reduced. In addition, as shown in FIG. 11, the electrode terminal 214 includes a side face 214b connected to the end face 214a. A distance h between the side face 214b of the electrode terminal 214 and an inner sidewall 232a of the recess 232 in a second direction Y is at least 2 mm. The second direction Y is perpendicular to the first direction X. Here, the second direction Y means a radial direction of the electrode terminal 214. Here, if the fixed connection is implemented by welding, the distance between the side face 214b of the electrode terminal 214 and the inner sidewall 232a of the recess 232 in the second direction Y is preferably at least a maximum depth of a weld portion 215 (to be described hereinafter). This further ensures sufficient connection strength between two battery cells 20. In addition, high connection strength is ensured when the end face 214a of the battery cell 20 located at the end among the plurality of battery cells 20 arranged along the first direction X is fixedly connected to the busbar component, where the end face is provided with the recess 232.

Figure 12:
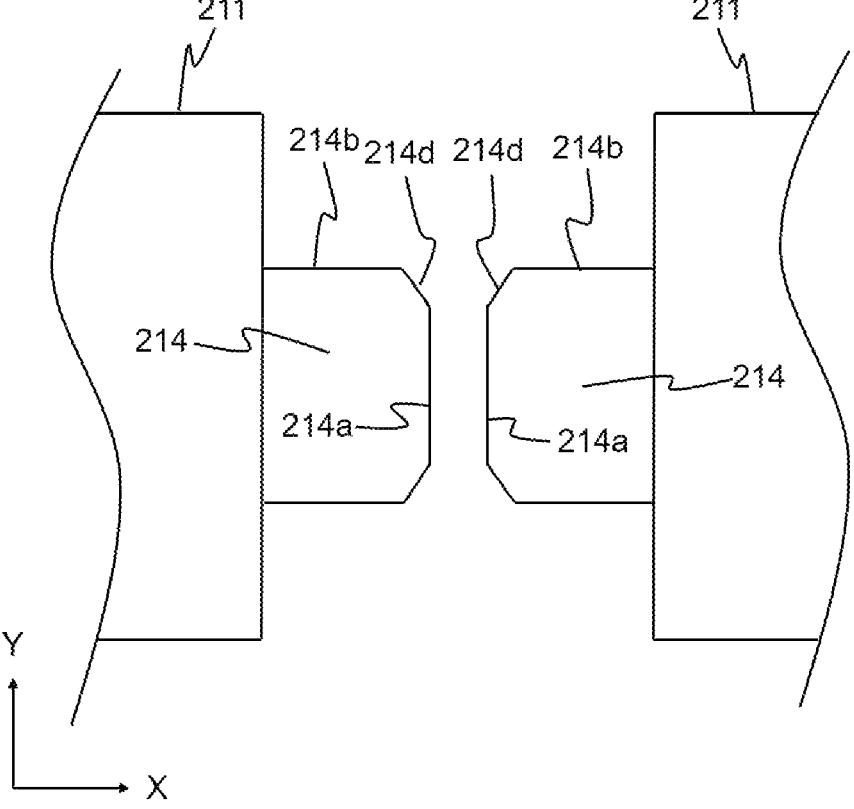
FIG. 12 is a schematic sectional view of two battery cells before being connected fixedly according to some embodiments of this application.
Figure 13:
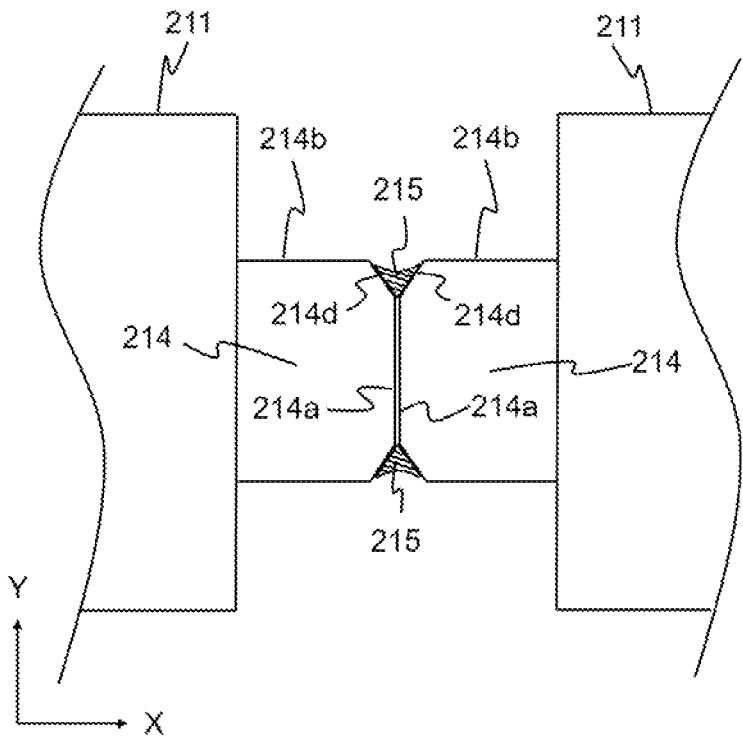
FIG. 13 is a schematic sectional view of the two battery cells shown in FIG. 12 and connected fixedly.

FIG. 12 is a schematic sectional view of two battery cells 20 before being connected fixedly according to some embodiments of this application. FIG. 13 is a schematic sectional view of the two battery cells 20 shown in FIG. 12 and connected fixedly. As shown in FIG. 12 and FIG. 13, a weld portion 215 is formed at the outer periphery of at least one of the two end faces 214a. The weld portion 215 is configured to implement fixed connection between the two electrode terminals 214 disposed opposite to each other along the first direction X. More specifically, the "two electrode terminals 214" here are "two electrode terminals 214 disposed opposite to each other along the first direction and belonging to the two battery cells 20". This facilitates the fixed connection between the two electrode terminal 214 and ensures sufficient connection strength.

In addition, as shown in FIG. 12 and FIG. 13, the electrode terminal 214 includes a side face 214b and a connecting face 214d. The connecting face 214d is configured to connect the end face 214a and the side face 214b. Two connecting faces 214d of the two electrode terminals 214 disposed opposite to each other along the first direction X are configured to form an accommodation space. The weld portion 215 is formed in the accommodation space. The weld portion 215 does not extend beyond the side face 214b in a second direction Y. The second direction Y is perpendicular to the first direction X. The second direction Y is the radial direction of the electrode terminal 214. In the embodiments shown in FIG. 12 and FIG. 13, the connecting face 214d is an inclined face, and specifically, an inclined plane, but is not limited the examples enumerated here. The connecting face 214d may be a curved face instead. In this way, the weld portion 215 is formed in the accommodation space without protruding from the side face 214b of the electrode terminal 214. On the one hand, deviations of the weld portions 215 between the battery cells 20 are reduced, and steady fixed connection is implemented. On the other hand, the levelness of the side face 214b of the electrode terminal 214 is maintained, and it is convenient to arrange various signal sampling parts on the side face 214b of the electrode terminal 214. Here, the weld portion 215 is formed by, as an example but not limited to, laser welding. Alternatively, the weld portion may be formed by a welding method well known to a person skilled in the art.

Figure 14:
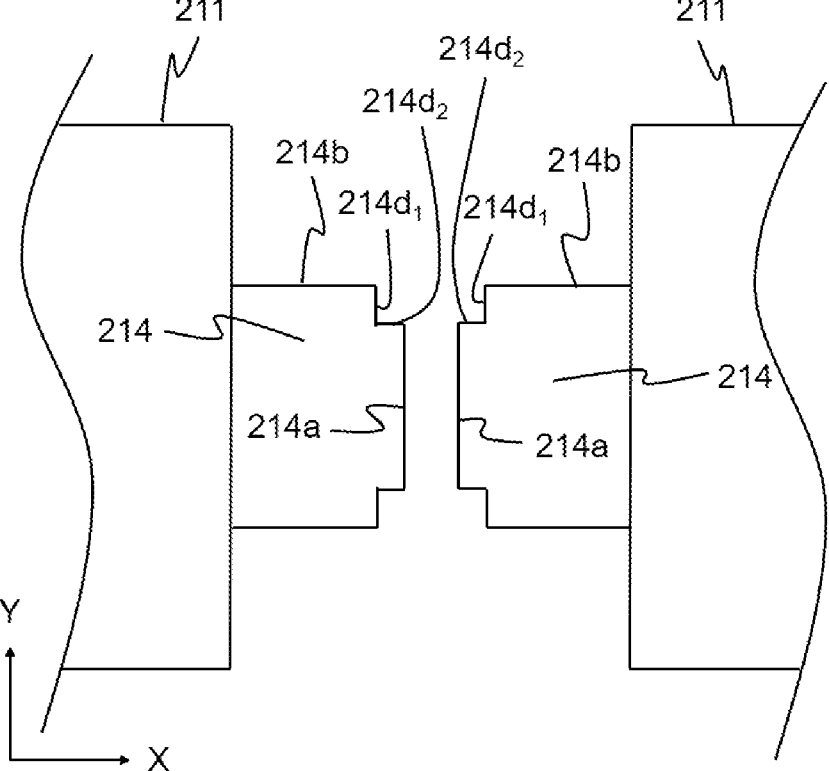
FIG. 14 is a schematic sectional view of two battery cells before being connected fixedly according to some embodiments of this application.
Figure 15:
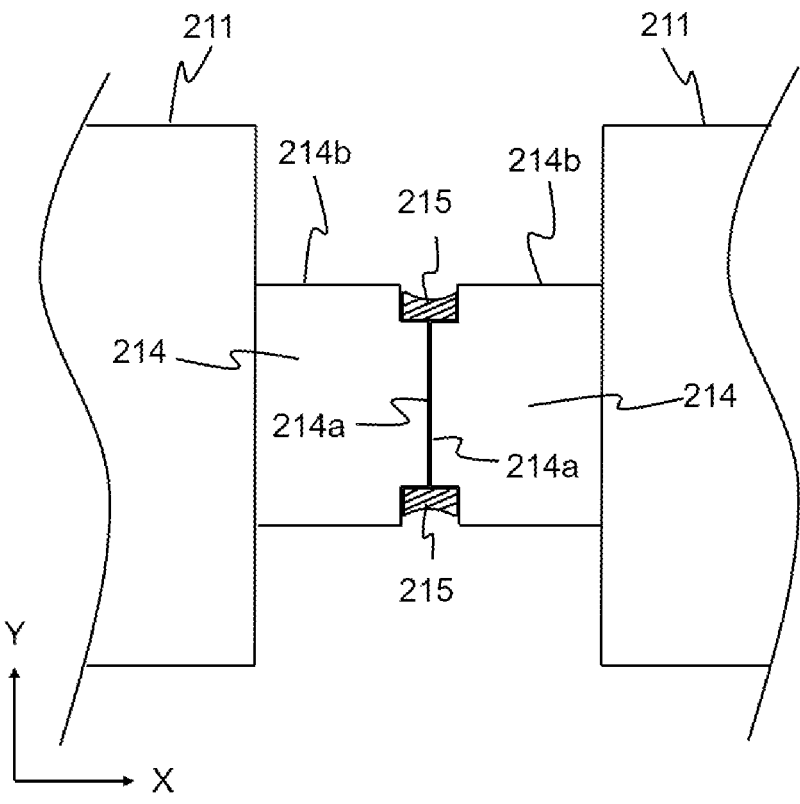
FIG. 15 is a schematic sectional view of the two battery cells shown in FIG. 14 and connected fixedly.

FIG. 14 is a schematic sectional view of two battery cells 20 before being connected fixedly according to some embodiments of this application. FIG. 15 is a schematic sectional view of the two battery cells 20 shown in FIG. 14 and connected fixedly. As shown in FIG. 14 and FIG. 15, the connecting face 214d includes a stepped face 214d1 and a stepped face 214d2. The stepped faces 214d1 and 214d2 are configured to form an accommodation space. The weld portion 215 is formed in the accommodation space. The weld portion 215 does not extend beyond the side face 214b in the second direction Y. In this way, the weld portion 215 is formed in the accommodation space without protruding from the side face 214b of the electrode terminal 214. On the one hand, deviations of the weld portions 215 between the battery cells 20 are reduced, and steady fixed connection is implemented. On the other hand, the levelness of the side face 214b of the electrode terminal 214 is maintained, and it is convenient to arrange various signal sampling parts on the side face 214b of the electrode terminal 214.

Figure 16:
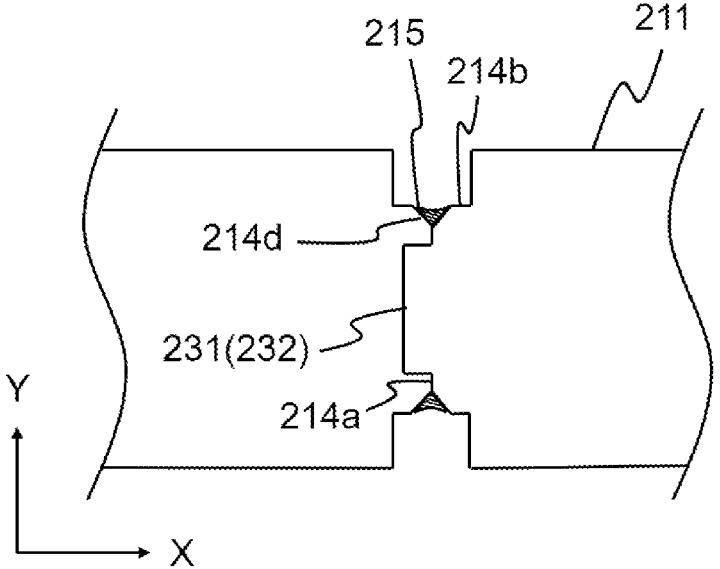
FIG. 16 is a schematic sectional view of two battery cells connected fixedly according to some embodiments of this application.

FIG. 16 is a schematic sectional view of two battery cells 20 connected fixedly according to some embodiments of this application. The two battery cells 20 shown in FIG. 16 combine features of the two battery cells 20 shown in FIG. 10 and FIG. 12. Specifically, one of the two electrode terminals 214 includes a bulge 231 protruding from the end face 214a, and the other of the two electrode terminals 214 includes a recess 232 that sinks from the end face 214a. The recess 232 and the bulge 231 snap-fit with each other in the first direction X. In addition, the electrode terminal 214 includes a side face 214b and a connecting face 214d. The connecting face 214d is configured to connect the end face 214a and the side face 214b. Two connecting faces 214d of the two electrode terminals 214 are configured to form an accommodation space. The weld portion 215 is formed in the accommodation space. The weld portion 215 does not extend beyond the side face 214b in the second direction Y. Here, the connecting face 214d is an inclined face. Therefore, through the fit between the bulge 231 and the recess 232, the two battery cells 20 are aligned with each other more accurately, and the arrangement error of the battery cells 20 is reduced. In addition, the weld portion 215 is formed in the accommodation space without protruding from the side face 214b of the electrode terminal 214. On the one hand, deviations of the weld portions 215 between the battery cells 20 are reduced, and steady fixed connection is implemented. On the other hand, the levelness of the side face 214b of the electrode terminal 214 is maintained, and it is convenient to arrange various signal sampling parts on the side face 214b of the electrode terminal 214.

Figure 17:
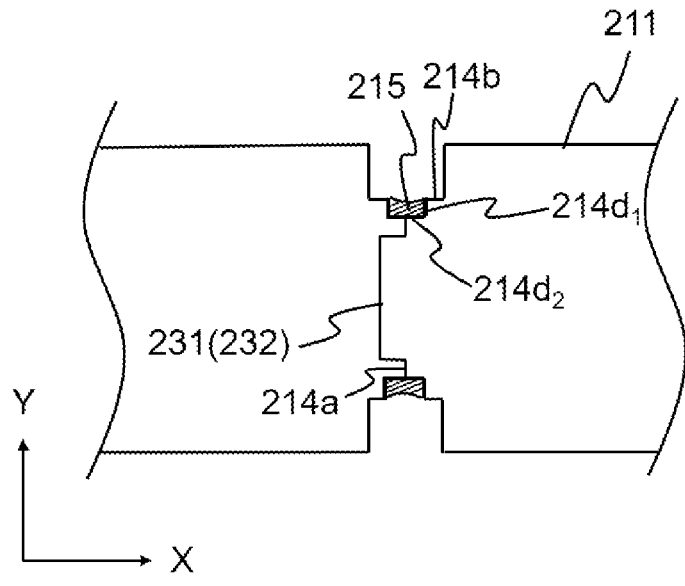
FIG. 17 is a schematic sectional view of two battery cells connected fixedly according to some embodiments of this application.

FIG. 17 is a schematic sectional view of two battery cells 20 connected fixedly according to some embodiments of this application. The two battery cells 20 shown in FIG. 17 combine features of the two battery cells 20 shown in FIG. 10 and FIG. 14. Specifically, one of the two electrode terminals 214 includes a bulge 231 protruding from the end face 214a, and the other of the two electrode terminals 214 includes a recess 232 that sinks from the end face 214a. The recess 232 and the bulge 231 snap-fit with each other in the first direction X. Moreover, the electrode terminal 214 includes a side face 214b and stepped faces 214d1 and 214d2. The stepped faces 214d1 and 214d2 are configured to connect the end face 214a and the side face 214b. The stepped faces 214d1 and 214d2 of the two electrode terminals 214 are configured to form an accommodation space. The weld portion 215 is formed in the accommodation space. The weld portion 215 does not extend beyond the side face 214b in the second direction Y. Therefore, through the fit between the bulge 231 and the recess 232, the two battery cells 20 are aligned with each other more accurately, and the arrangement error of the battery cells 20 is reduced. In addition, the weld portion 215 is formed in the accommodation space without protruding from the side face 214b of the electrode terminal 214. On the one hand, deviations of the weld portions 215 between the battery cells 20 are reduced, and steady fixed connection is implemented. On the other hand, the levelness of the side face 214b of the electrode terminal 214 is maintained, and it is convenient to arrange various signal sampling parts on the side face 214b of the electrode terminal 214.

Figure 18:
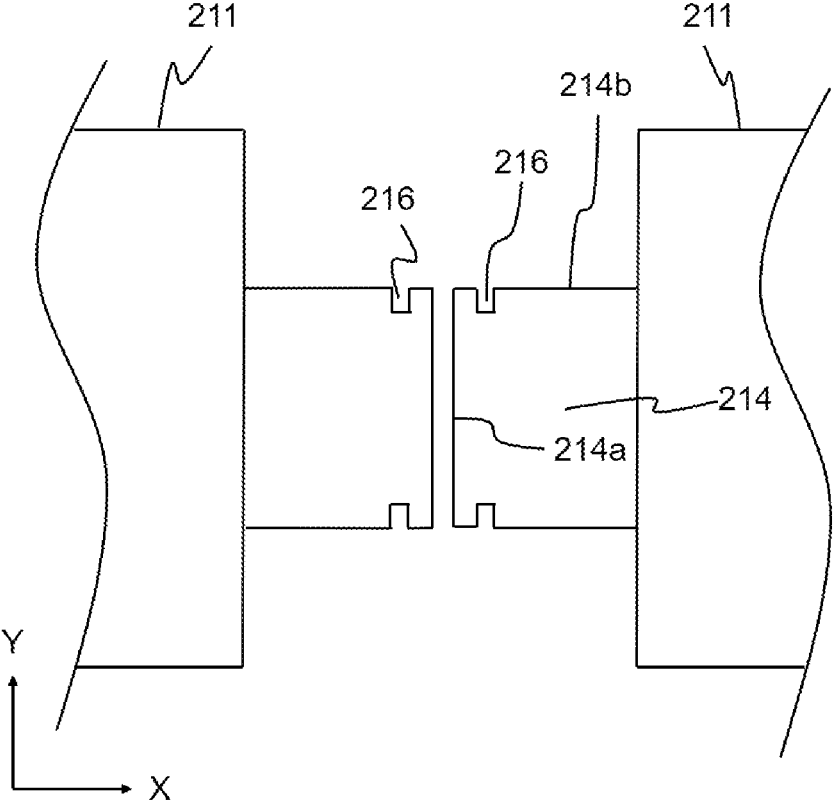
FIG. 18 is a schematic sectional view of two battery cells before being connected fixedly according to some embodiments of this application.
Figure 19:
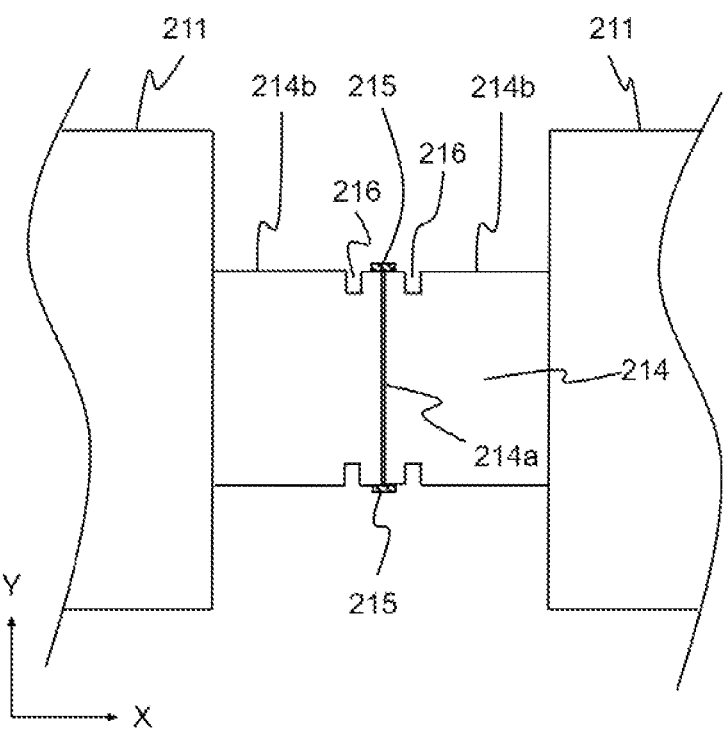
FIG. 19 is a schematic sectional view of the two battery cells shown in FIG. 18 and connected fixedly.

FIG. 18 is a schematic sectional view of two battery cells 20 before being connected fixedly according to some embodiments of this application. FIG. 19 is a schematic sectional view of the two battery cells 20 shown in FIG. 18 and connected fixedly. As shown in FIG. 18 and FIG. 19, a stress release portion 216 is formed at an outer periphery of at least one of the two electrode terminals 214 disposed opposite to each other along the first direction X. The stress release portion 216 is configured to release a stress generated in a case of fixedly connecting the two electrode terminals 214 disposed opposite to each other along the first direction X. More specifically, the "two electrode terminals 214" here are "two electrode terminals 214 disposed opposite to each other along the first direction X and belonging to the two battery cells 20".

In a case of fixedly connecting (such as welding) along the outer periphery of at least one of the two surface-contacted end faces 214a, a part that is fixedly connected first shrinks to some extent against a part that is fixedly connected later, thereby resulting in a stress. Through the foregoing structure, the stress generated in a case of fixedly connecting the two battery cells 20 can be released by the stress release portion 216, thereby preventing the electrode terminal 214 from being deformed by the stress in a process of fixedly connecting the outer periphery of the electrode terminal 214.

In addition, as shown in FIG. 18 and FIG. 19, the stress release portion 216 is a groove disposed at the outer periphery of at least one of the two electrode terminals 214 disposed opposite to each other along the first direction X. Optionally, the groove is an annular groove formed along the outer periphery of the electrode terminal 214. Therefore, on the one hand, the stress release portion 216 is easily processible. On the other hand, during the fixed connection, it is not necessary to select an initial operation position for starting the fixed connection, thereby increasing the convenience of operation.

In addition, optionally, a cross-sectional shape of the groove is a rectangle, a trapezoid, a semicircle, or an arch. This facilitates processing of the stress release portion 216.

Figure 20:
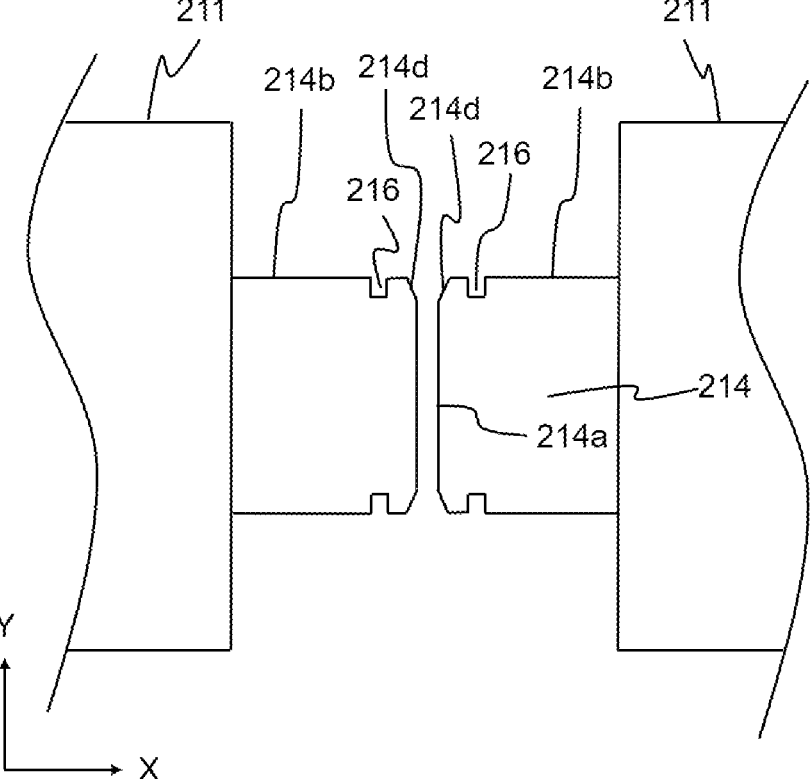
FIG. 20 is a schematic sectional view of two battery cells before being connected fixedly according to some embodiments of this application.
Figure 21:
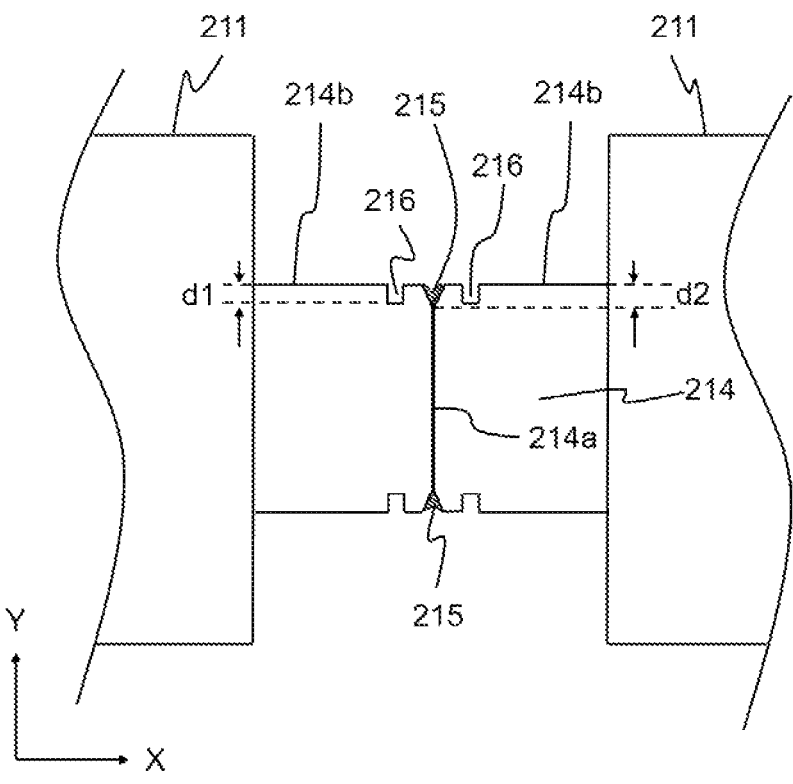
FIG. 21 is a schematic sectional view of the two battery cells shown in FIG. 20 and connected fixedly.

FIG. 20 is a schematic sectional view of two battery cells 20 before being connected fixedly according to some embodiments of this application, and FIG. 21 is a schematic sectional view of the two battery cells 20 shown in FIG. 20 and connected fixedly. The two battery cells 20 shown in FIG. 20 combine features of the two battery cells 20 shown in FIG. 12 and FIG. 18. As shown in FIG. 20 and FIG. 21, the electrode terminal 214 includes a side face 214b and a connecting face 214d. The connecting face 214d is configured to connect the end face 214a and the side face 214b. Two connecting faces 214d of the two electrode terminals 214 disposed opposite to each other along the first direction X are configured to form an accommodation space. The weld portion 215 is formed in the accommodation space. The stress release portion 216 is a groove disposed at the outer periphery of at least one of the two electrode terminals 214 disposed opposite to each other along the first direction X. A cross-sectional shape of the groove is a rectangle. In addition, as shown in FIG. 21, in the second direction Y, the depth d1 of the groove is less than the depth d2 of the weld portion 215. In this way, the weld portion 215 is rigid enough to avoid looseness of the connection part of the electrode terminal 214 caused by deformation.

Figure 22:
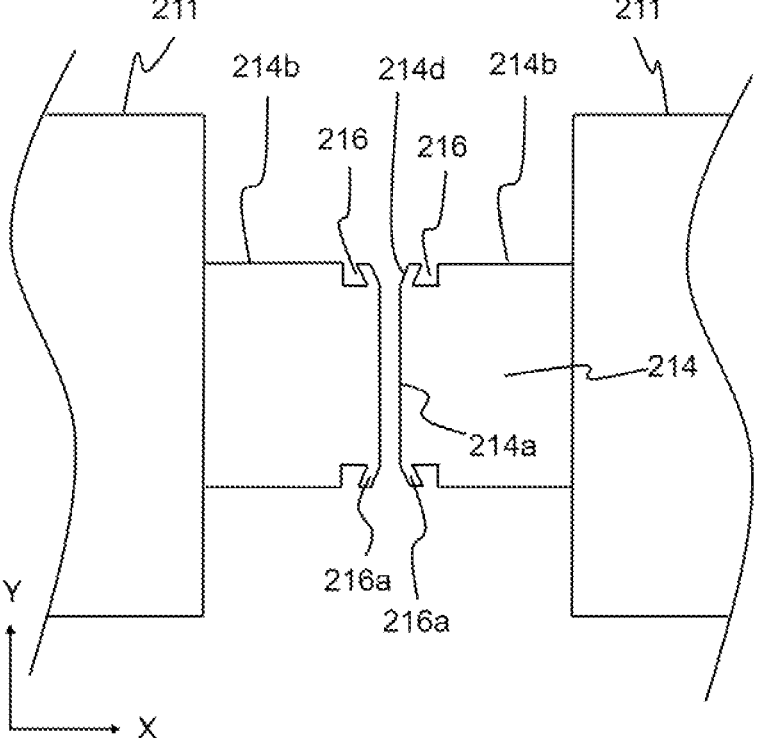
FIG. 22 is a schematic sectional view of two battery cells before being connected fixedly according to some embodiments of this application.
Figure 23:
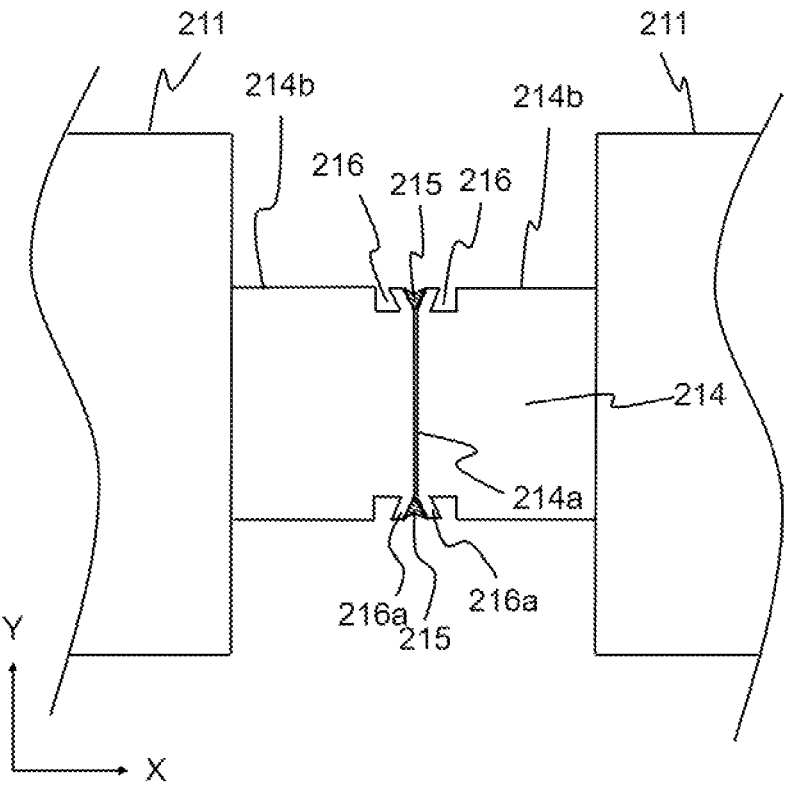
FIG. 23 is a schematic sectional view of the two battery cells shown in FIG. 22 and connected fixedly.

FIG. 22 is a schematic sectional view of two battery cells 20 before being connected fixedly according to some embodiments of this application, and FIG. 23 is a schematic sectional view of the two battery cells 20 shown in FIG. 22 and connected fixedly. As shown in FIG. 22, a weld portion 215 is formed at the outer periphery of the two end faces 214a. The weld portion 215 is configured to implement fixed connection between the two electrode terminals 214 disposed opposite to each other along the first direction X. In addition, a stress release portion 216 is formed at an outer periphery of at least one of the two electrode terminals 214 disposed opposite to each other along the first direction X. The stress release portion 216 is configured to release a stress generated in a case of fixedly connecting the two electrode terminals 214 disposed opposite to each other along the first direction X. Here, the stress release portion 216 is a groove disposed at the outer periphery of at least one of the two electrode terminals 214 disposed opposite to each other along the first direction X. A cross-sectional shape of the groove is a trapezoid. In this way, a sidewall portion 216a, close to the end face 214a, of the groove, is inclined. The weld stress causes the sidewall portion 216a to deform toward the end face 214a, thereby preventing the stress from being exerted on the entire electrode terminal 214, thereby effectively releasing the stress generated in a case of fixedly connecting the two electrode terminals 214.

The battery 10 and the device according to embodiments of this application have been described above. The following describes a method and apparatus for manufacturing a battery according to embodiments of this application. For information not detailed in the following embodiments, refer to the preceding embodiments.

Figure 24:
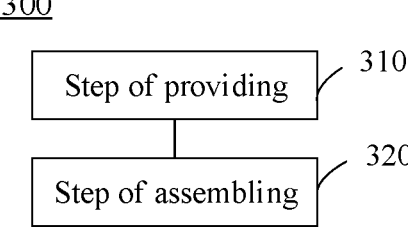
FIG. 24 is a schematic flowchart of a method for manufacturing a battery according to some embodiments of this application.

FIG. 24 is a schematic flowchart of a method 300 for manufacturing a battery according to an embodiment of this application. As shown in FIG. 24, the method 300 may include the following steps:

310. Provide a plurality of battery cells 20 arranged along a first direction X, where an electrode terminal 214 is disposed at each of two ends of each of the battery cells 20 along the first direction X, so that two battery cells 20 include two electrode terminals 214 opposite to each other along the first direction X; and 320. Form surface contact between two end faces 214*a* opposite to each other along the first direction X and belonging to the two electrode terminals 214, and connect the two electrode terminals 214 fixedly along an outer periphery of at least one of the two end faces 214*a* to implement electrical connection between the two battery cells 20.

Figure 25:
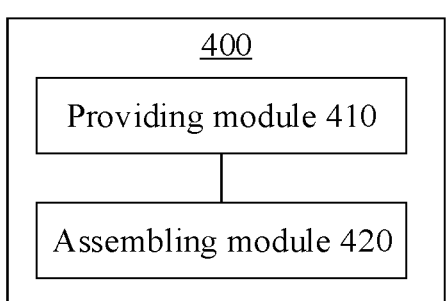
FIG. 25 is a schematic block diagram of an apparatus for manufacturing a battery according to some embodiments of this application.

FIG. 25 is a schematic block diagram of an apparatus 400 for manufacturing a battery according to an embodiment of this application. As shown in FIG. 25, the apparatus 400 for manufacturing a battery includes: a providing module 410 and an assembling module 420.

The providing module 410 is configured to provide a plurality of battery cells 20 arranged along a first direction X. An electrode terminal 214 is disposed at each of two ends of each of the battery cells 20 along the first direction X, so that two battery cells 20 include two electrode terminals 214 opposite to each other along the first direction X.

The assembling module 420 is configured to form surface contact between two end faces 214*a* opposite to each other along the first direction X and belonging to the two electrode terminals 214, and connect the two electrode terminals 214 fixedly along an outer periphery of at least one of the two end faces 214*a* to implement electrical connection between the two battery cells 20.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A battery comprising:

two battery cells arranged along a first direction and including two electrode terminals opposite to each other along the first direction, a first electrode terminal of the two electrode terminals being disposed at an end of a first battery cell of the two battery cells along the first direction, and a second electrode terminal of the two electrode terminals being disposed at an end of a second battery cell of the two battery cells along the first direction;

wherein:

surface contact is formed between two end faces of the two electrode terminals, respectively, the two end faces being opposite to each other along the first direction;

one of the two electrode terminals includes a bulge protruding from the end face of the one electrode terminal, and the other of the two electrode terminals includes a recess that sinks from the end face of the other electrode terminal, the recess and the bulge snap- fit with each other in the first direction;

the two electrode terminals are configured to be fixedly connected to each other along an outer periphery of at least one of the two end faces to implement electrical connection between the two battery cells;

a weld portion is formed at the outer periphery of the at least one of the two end faces, and the weld portion is configured to implement fixed connection between the two electrode terminals;

each of the two electrode terminals includes a side face and a connecting face, and the connecting face is configured to connect the end face and the side face;

the two connecting faces of the two electrode terminals are configured to form an accommodation space;

the weld portion is formed in the accommodation space without extending beyond the side face in a second direction, the second direction being perpendicular to the first direction, such that surface levelness across the two side faces of the two electrode terminals corresponding to the accommodation space is maintained; and a distance between the side face of the electrode terminal including the bulge and an inner sidewall of the recess in the second direction is at least 2 mm.

2. The battery according to claim 1, wherein:

a shape of each of the end faces is a closed shape, and a surface enclosed by the closed shape corresponding to each of the end faces is configured to form the surface contact.

3. The battery according to claim 1, wherein:

a shape of each of the end faces is a circle, an ellipse, or a polygon.

4. The battery according to claim 1, wherein:

the two end faces are equal in area and identical in shape, and projections of the two end faces along the first direction are coincident.

5. The battery according to claim 1, wherein:

a first end face of the two end faces is larger in area than a second end face of the two end faces, and a projection of the second end face along the first direction is within a projection of the first end face along the first direction.

6. The battery according to claim 1, wherein:

the two electrode terminals are configured to be fixedly connected to each other continuously along the outer periphery of the at least one of the two end faces.

7. The battery according to claim 1, wherein:

the two electrode terminals are configured to be fixedly connected to each other discontinuously along the outer periphery of the at least one of the two end faces.

8. The battery according to claim 1, wherein:

each of the two electrode terminals protrudes along the first direction away from an interior of a corresponding one of the two battery cells, and a protrusion height of each of the two electrode terminals is at least 2 mm.

9. The battery according to claim 1, wherein:

the two battery cells further include two end caps opposite to each other along the first direction and spaced apart from each other by 4 mm to 20 mm;

one of the two end caps is disposed at the end of the first battery cell along the first direction, and another one of the two end caps is disposed at the end of the second battery cell along the first direction; and each of the two electrode terminals is disposed at a corresponding one of the two end caps.

10. The battery according to claim 1, wherein:

the connecting face is an inclined face, a stepped face, or a curved face.

11. The battery according to claim 1, wherein:

a stress release portion is formed at an outer periphery of at least one of the two electrode terminals, and the stress release portion is configured to release a stress generated in a case of fixedly connecting the two electrode terminals.

12. The battery according to claim 11, wherein:

the stress release portion includes a groove disposed at the outer periphery of the at least one of the two electrode terminals.

13. The battery according to claim 12, wherein:

the groove includes an annular groove formed along the outer periphery of the at least one of the two electrode terminals.

14. The battery according to claim 12, wherein in the second direction, a depth of the groove is less than a depth of the weld portion.

15. A device comprising a battery configured to provide electrical energy, the battery including:

two battery cells arranged along a first direction and including two electrode terminals opposite to each other along the first direction, a first electrode terminal of the two electrode terminals being disposed at an end of a first battery cell of the two battery cells along the first direction, and a second electrode terminal of the two electrode terminals being disposed at an end of a second battery cell of the two battery cells along the first direction;

wherein:

surface contact is formed between two end faces of the two electrode terminals, respectively, the two end faces being opposite to each other along the first direction;

one of the two electrode terminals includes a bulge protruding from the end face of the one electrode terminal, and the other of the two electrode terminals includes a recess that sinks from the end face of the other electrode terminal, the recess and the bulge snap- fit with each other in the first direction;

the two electrode terminals are configured to be fixedly connected to each other along an outer periphery of at least one of the two end faces to implement electrical connection between the two battery cells;

a weld portion is formed at the outer periphery of the at least one of the two end faces, and the weld portion is configured to implement fixed connection between the two electrode terminals;

each of the two electrode terminals includes a side face and a connecting face, and the connecting face is configured to connect the end face and the side face;

the two connecting faces of the two electrode terminals are configured to form an accommodation space;

the weld portion is formed in the accommodation space without extending beyond the side face in a second direction, the second direction being perpendicular to the first direction, such that surface levelness across the two side faces of the two electrode terminals corresponding to the accommodation space is maintained; and a distance between the side face of the electrode terminal including the bulge and an inner sidewall of the recess in the second direction is at least 2 mm.

\* \* \* \* \*